Sept. 24, 1963

D. A. BOOTS 3,105,232

POSITION INDICATION SYSTEMS

Filed April 20, 1959

David A. Boots,
INVENTOR
BY

ATTORNEY.

Sept. 24, 1963

D. A. BOOTS 3,105,232

POSITION INDICATION SYSTEMS

Filed April 20, 1959

David A. Boots,
INVENTOR
BY.
Robert H. Fraser
ATTORNEY.

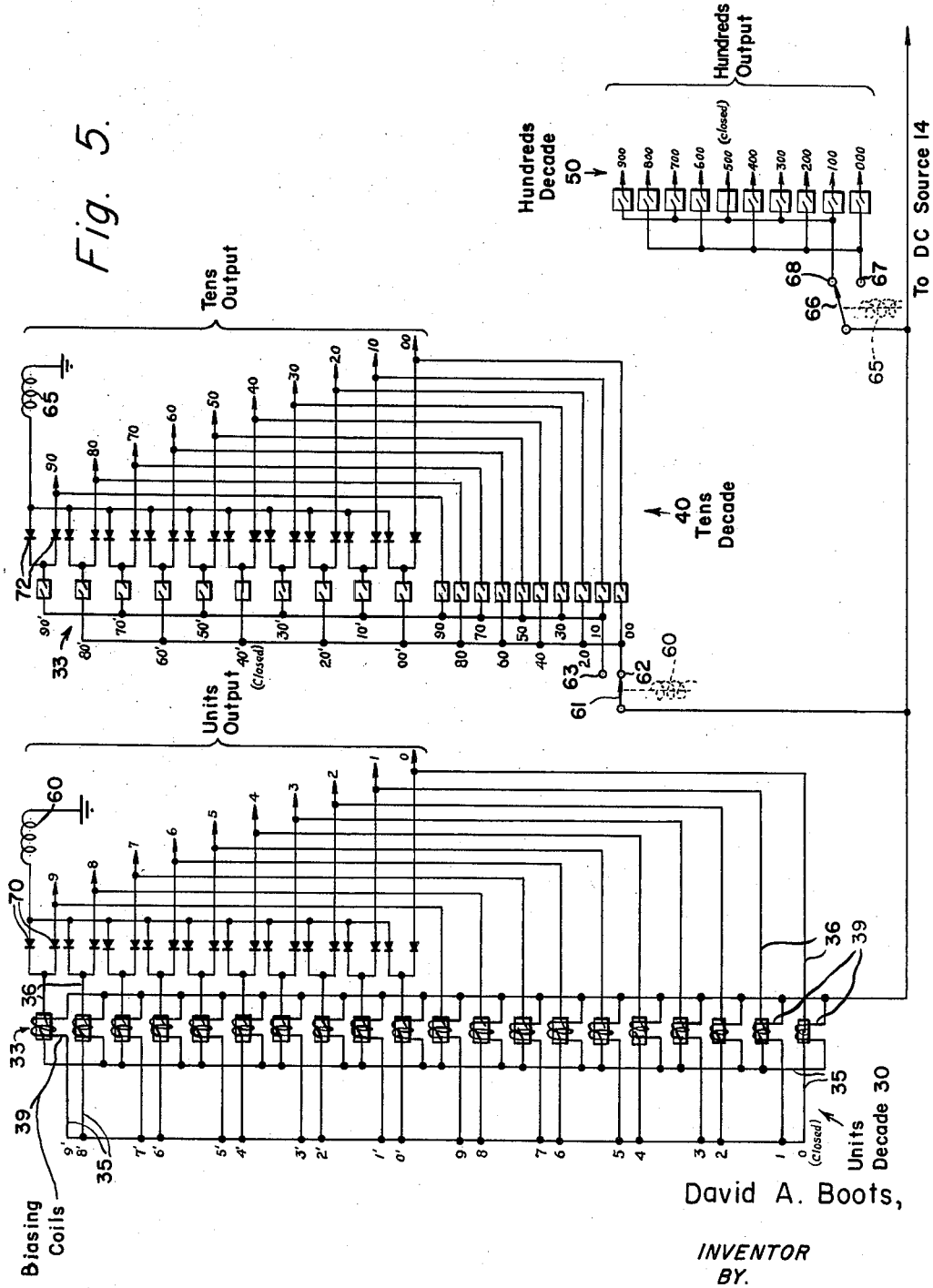

United States Patent Office 3,105,232
Patented Sept. 24, 1963

3,105,232
POSITION INDICATION SYSTEMS
David A. Boots, Arcadia, Calif., assignor to F. L. Moseley Co., a corporation of California
Filed Apr. 20, 1959, Ser. No. 807,521
14 Claims. (Cl. 340—347)

This invention relates to electrical signal generators which operate in response to moving elements, and particularly to a system for providing digital electrical signals to indicate the position of a movable mechanical element.

Data processing equipment often requires a conversion from the position of an element to digital signals. It may be desired, for example, to generate electrical signals which represent the position of a movable element, such as a shaft. Most of the so-called analog-to-digital converters thus operate to translate the rotational position of a shaft to a corresponding digital output.

Many analog-to-digital converters are known, but few provide desirable combinations of characteristics for a wide variety of applications. Many of such devices are not sufficiently accurate, as they may employ mechanical contacts which are subject to wear and ambiguous readings. Attempts have been made to increase the accuracy of these devices, but these attempts are usually accompanied by an increase in the cost and complexity of the system. Increasing the number of contacts, for example, not only increases the precision with which the assembly must be manufactured, but also increases the drag imposed on the driving system.

Another important consideration is the reliability with which such electrical signal generators provide accurate information. In this connection the torque required to operate the system is very important. Practically all contacting systems achieve increased contact reliability only at an increase in contact pressure, and this has a consequent adverse effect on the amount of turning torque required. Similarly, the drag on the shaft is increased when greater definition is desired, and when special elements are used for sensing the contacts. In many instances the input shaft is extremely sensitive to drag or torque from the conversion equipment, and where this is true it has been difficult to get accurate high definition readings.

With most existing systems, reliability is affected by susceptibility to ambiguities as well as to wear. Consequently, many circuit arrangements have been employed which seek to minimize the possibility of ambiguous readings. Circuits employed for this purpose, however, almost invariably increase the complexity of the system substantially without concurrently increasing the reliability or speed of the system.

It is particularly desirable for many applications to provide an analog-to-digital converter which operates to provide decimal outputs. Such outputs are particularly useful for visual indication, and for data processing systems which utilize decimal codes. It will be apparent that important advantages will have been derived if such a converter can be constructed to operate reliably and without appreciable torque and inaccuracy due to wear or ambiguity.

It is therefore an object of the present invention to provide an improved system for generating electrical signals from the position of a movable element.

It is another object of this invention to provide an improved analog-to-digital converter capable of operating accurately and reliably at high speed.

Yet another object of this invention is to provide an improved shaft position indicator capable of continuous operation with a minimum of internal wear.

Yet another object of this invention is to provide an improved device for converting shaft position to electrical digital signals which are particularly accurate.

It is a further object of this invention to provide an improved system for converting analog position to digital signals with a minimum of wear and torque, with substantially no moving contacting elements, at high speeds, and with freedom from ambiguity.

An electrical signal generator in accordance with the present invention may operate to provide decimal outputs which indicate the position of a movable input shaft. To provide a multi-digit decimal output, the system may employ a number of groups of magnetic switches, each of which represents a different order of magnitude. The switches may be magnetic reed elements encased in elongated non-magnetic bodies, and each group may be mounted symmetrically about a central axis. Thus, each group of switches may define a cylinder within which may be mounted a rotatable shaft carrying an actuating permanent magnet at the end of a radial arm extending from the shaft. Input shaft position may be transmitted between the separate rotatable shafts by step-down gearing which establishes the decade relationships desired for the groups of switches. Then, as the magnets within each group of switches change position in correspondence to the position of the input shaft, each of the magnets closes the magnetic reed switch to which it is most closely adjacent. Circuits coupled to the switches then provide decimal outputs from the system.

Among the features of this invention are arrangements which minimize ambiguous readings. The first decade, the group of switches representing the lowest order of magnitude, may include a separate magnetic biasing coil on each of the non-magnetic switch bodies. Alternate ones of the switches may have a series connection with the biasing coils of the alternately arrayed switches. This series connnection is made in a sense such that, when a switch is closed, the current through the adjacent biasing coil creates a magnetic field which tends to oppose closure of the enclosed switches. The arrangement insures that one and only one switch in the lowest order stage is closed for any position of the actuating element.

In accordance with further features of the present invention, the non-ambiguous reading derived from the first stage is utilized in conjunction with other arrangements to assure freedom from ambiguity in the succeeding stages. In the lowest order stage, there may be two sets of switches, each set representing a continuous sequence of decimal places, with the two sets being diametrally opposed. Each of these sets of switches is scanned with, and thus corresponds to, either the odd or the even switches in the next higher order decade. Consequently, circuit arrangements may be employed to insure that, for a given switch position in the lowest order decade, only an odd or even switch can provide outputs in the next higher order decade. Consequently, reliability is further enhanced. The technique may be extended, if desired, to control the selection of odd and even switches in later succeeding stages.

A better understanding of the invention may be had from a reading of the following detailed description and an inspection of the drawings, in which:

FIG. 5 is a schematic circuit diagram of circuits which may be employed with the arrangement of FIG. 1 to provide conversion between shaft position and a three digit decimal indication.

Figure 1:
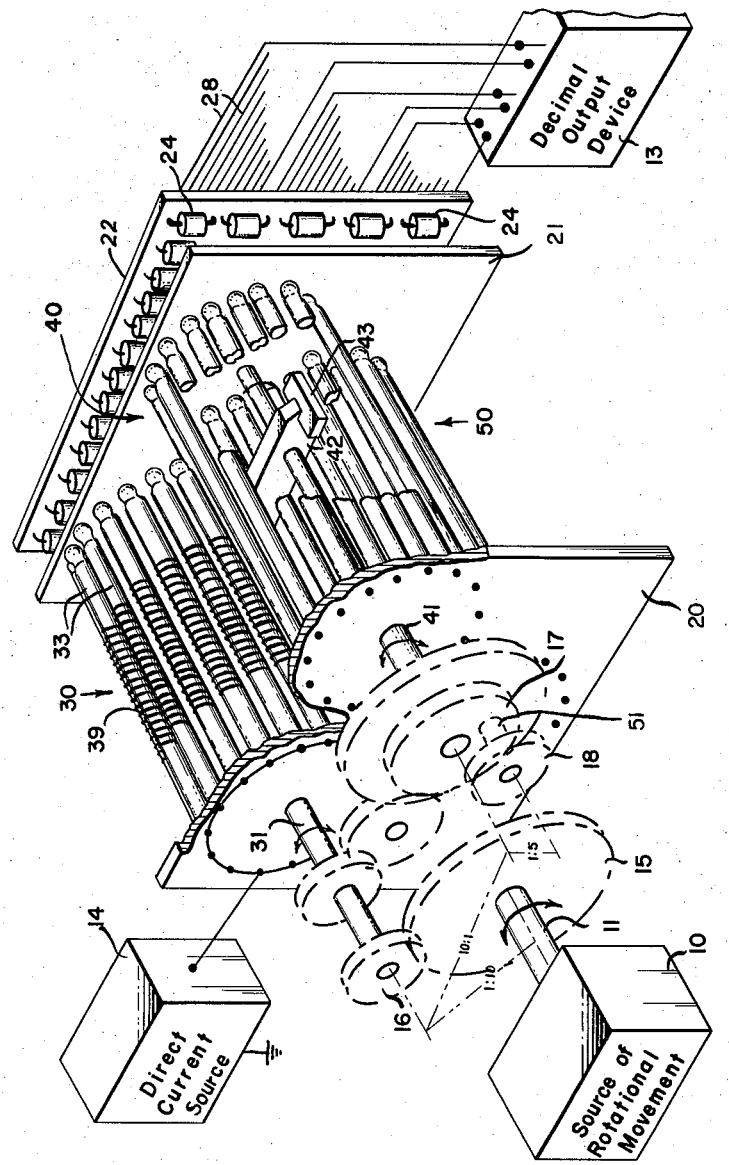
FIG. 1 is a perspective view, partially broken away, and partially in simplified block diagram form, of a shaft position indicator constructed in accordance with the invention.
Figure 2:
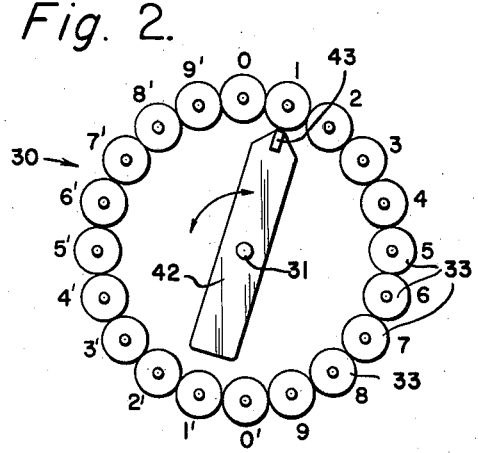
FIG. 2 is an end sectional view of a portion of the apparatus of FIG. 1, showing the arrangement of one of a group of magnetic switches therein.

An electrical signal generator constructed in accordance with the invention has particular utility when performing the function of converting shaft position to decimal indications. Such a system, constructed to convert the position of an input shaft to a three digit decimal indication, is shown in FIGS. 1 and 2, to which reference is now made. An external source of rotational movement 10, which may be any element (or part of a system) whose position it is desired to monitor, is coupled to a shaft constituting an input shaft 11 of the present system. The input shaft 11 may rotate continuously, or shift between various angular positions. The desired decimal indications are to be provided at a decimal output device 13, which may be a visual indicator, a signalling system, a recording system, or which may constitute the input to further data processing equipment. A direct current (D.C.) source 14 provides the electrical energy for energizing the decimal output device 13 in accordance with the switching provided by the present system.

The input shaft 11 drives an input gearing system 15–18 which establishes, in this example, three different speeds of rotation which together with other relationships described below represent separate orders of magnitude or decades. It will be understood that the input gearing system 15–18 has been indicated in general form only, and that any direct drive system of high accuracy which can establish the desired decade relationships may be employed. The remainder of the electrical generator system in accordance with the present invention may be conveniently mounted between three assembly boards 20, 21 and 22 which provide both physical support and a structure for electrical connections. The main conversion structure may be mounted between the first and second assembly boards 20 and 21, while diode elements 24 and associated circuitry to be described below may be mounted between the second and third assembly boards 21 and 22. Output leads 28 may be taken from one side of the third assembly board and applied to the decimal output device 13.

One principal portion of this electrical signal generator system includes three separate groups or stages of switches, these groups hereafter being referred to as the units decade 30, the tens decade 40, and the hundreds decade 50. Each of the decade groups 30, 40 and 50 has a corresponding central shaft 31, 41 and 51 which is rotatably mounted at its ends in the assembly boards 20 and 21. Centrally positioned on each of the rotatable shafts 31, 41 and 51 is a radial arm, such as the radial arm 42 shown in the broken away portion of the tens decade 40 and in FIG. 2. At the free end of the radial arm 42 is mounted a directional field permanent magnet 43, which thus describes a circular arc as the associated shaft 41 is rotated. It will be understood that each of the other decades 30 and 50 has a like arm and magnet arrangement, but that these have been omitted for simplicity in the drawing.

Figure 4:
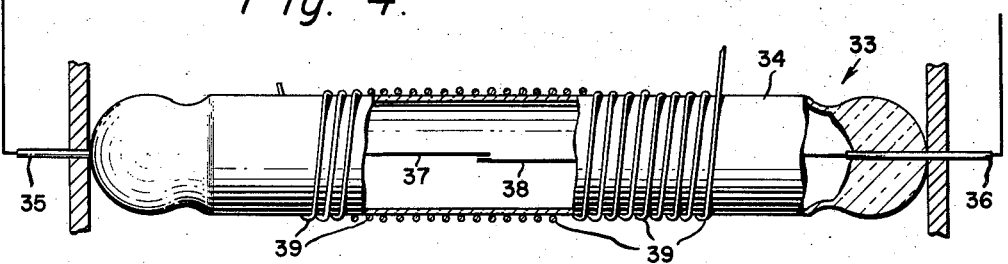
FIG. 4 is a side view, partially broken away, of one of the switches which may be employed in the arrangement of FIG. 1.

Each of the decade groupings consists of a number of like magnetic reed element switches 33, such as are illustrated in more detail in the broken away view of FIG. 4. Referring briefly to that figure, each of the switches 33 is seen to include an elongated, non-magnetic body structure 34, such as glass, which may have narrowed ends, as shown, for mounting in the assembly boards 20 and 21. Each switch 33 also includes an electrical input terminal 35 and an electrical output terminal 36 which are selectively coupled together to complete a circuit by a pair of magnetizable reed elements 37 and 38 extending internally along the length of the switch 33. The reed elements 37 and 38 are mounted so that they are normally maintained in the open condition. When subjected to a magnetic field of proper strength and direction, however, they are caused to draw together to close the electrical circuit between the input terminal 35 and the output terminal 36. A conductor 39 may be wound in the form of a helical coil about the non-magnetic body of the switch 33, so as to provide a magnetic bias source for the enclosed reed elements.

Referring again to FIG. 1, the switches 33 of the various decade stages or groups 30, 40 and 50 are seen to be alike, except that each of the switches of the first or units decade 30 carries a biasing coil 39. The decades further differ in the number of switches which are employed, the units decade 30 and the tens decade 40 having twenty switches each, and the hundreds decade 50 having ten switches. The manner in which decimal outputs having decade relationships are provided is described below.

The D.C. source 14 is coupled to the input terminals 35 of each of the switches 33 in the units decade 30. Couplings to the input terminals of the succeeding decades 40 and 50 from the D.C. source 14 are made in a fashion which is described in detail with respect to FIG. 5. All of the switches 33, however, derive current for signalling purposes from the D.C. source 14.

As may be seen in FIG. 1, the axis of each of the elongated switches 33 is substantially parallel to the central axis of the decade 30, 40 or 50 in which the switch 33 is located. The switches 33 are disposed symmetrically about the central axis, to define a cylinder in which each of the switches has a like radial spacing from the path of traverse of the associated magnet element within the decade, such as the permanent magnet 43 in the tens decade 40.

Figure 3:
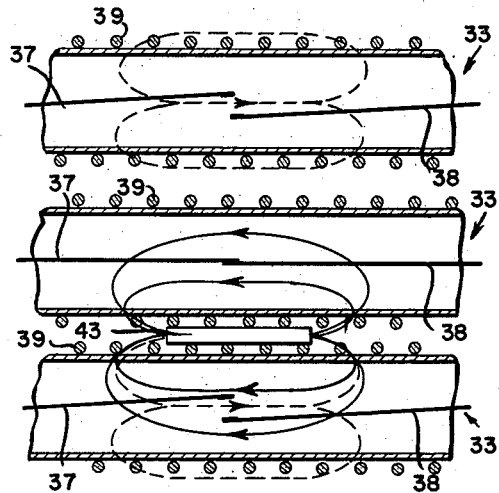
FIG. 3 is a diagrammatic view of three successive magnetic switches of one of the groups of switches, showing the disposition of magnetic fields therein during operation.

The manner in which the switches 33 are closed by the magnets 43, and the manner in which the biasing coils 39 operate in the units decade 30, may be better understood by reference to FIG. 3, which is a simplified representation of three adjacent ones of the switches 33 having biasing coils 39 and positioned in the units decade 30. The magnet 43 is shown in an intermediate position between two of the switches 33, and the directional external magnetic field established by the magnet 43 is represented (simplified) by solid lines. In this position, the flux pattern tends to concentrate in the magnetic material of the reed elements 37 and 38 of the center switch 33. In the center switch 33 of FIG. 3 the flux concentration is sufficient to have caused the reed elements 37 and 38 to snap together. The like elements of the adjacent switches are not, however, closed. As to the uppermost switch 33 which is furthest from the magnet 43, this is due primarily to lack of flux density in the magnetic field from the magnet 43.

The lower switch 33 is equally adjacent the magnet 43 with the center switch 33, however, and remains open because of the action of the biasing coil 39. As is described in more detail below, the circuit arrangement is such that the biasing coil 39 is energized when the adjacent switch (in this case the closed center switch of FIG. 3) is activated. The current provided through the coil 39 is in a sense to establish a magnetic field which opposes the flux concentrated in the reed elements 37 and 38 of the lower switch 33 by the permanent magnet 43. Accordingly, both of the switches which are immediately adjacent the center, closed switch 33 shown in FIG. 3 are subjected to this opposing or biasing field, and remain open. Further movement of the magnet in the direction toward the open switch, however, results in the flux from the magnet 43 overcoming the bias, so that the switch closes and a bias is applied to the previously closed center switch to cause it to open. Accordingly, even though the magnet 43 is positioned at a center point between two adjacent switches 33, the biasing coils act to prevent ambiguous readings. Thus, only one switch 33 is closed at a time. The strengths of the activating field and the cancelling field can be readily adjusted to provide extremely rapid and accurate switching as the shaft rotates the magnet 43.

We may now consider how the arrangement of FIG. 1 provides concurrent decimal values with decade relationships. As the input shaft 11 is rotated between different positions continuously, or shifted incrementally, the input gearing 15–18 connected to the input shaft 11 causes corresponding movements of the central shafts 31, 41 and 51 of the successive decades 30, 40 and 50. As previously indicated, there are step-down gearing ratios between the units decade 30 and the tens decade 40, and between the tens decade 40 and the hundreds decade 50. A ten to one step-down between the units decade 30 and the tens decade 40 establishes the desired decade relationship, because each of these decades 30 and 40 has twenty switches. Thus, a full rotation in the units decade 30 represents a count of twenty, which is the same count as is represented by the corresponding two increments of movement in the tens decade 40.

A five to one step-down is utilized between the tens decade and the hundreds decade 50, which has only ten switches. Five full cycles of the tens decade 40 are thus equal to one full cycle of the hundreds decade 50. Five full cycles at the tens decade 40 of twenty switches and one full cycle at the hundreds decade 50 are each equal to a count of one thousand. No particular gear relationship is necessary between the input shaft 11 and the shaft 31 of the units decade 30, this relationship being determined by the decimal range of indications desired for a given movement of the input shaft 11. A ten to one step-up relationship is shown, to keep the relative rates of rotation more nearly constant within the system, but any other ratio might be employed.

For continuous or incremental changes of the position of the input shaft, therefore, the shafts 31, 41 and 51 in the successive decades 30, 40 and 50 are moved correspondingly, but in a relationship which accunts for the number of switches in each decade and provides outputs representing successively higher orders of magnitude. Only one switch 33 is actuated at each incremental position of the actuating magnets within the three decades 30, 40 and 50. The moving members have very low inertia and very low frictional losses, and thus have low torque and small back lash. Furthermore, the operation of the switches 33 is accomplished without contact with a rotating member and consequently without wear.

For convenience in understanding the indicating circuit in accordance with the invention, certain number designations have been employed for each of the decades. Reference may be made to FIG. 2, which represents an end sectional view of the units decade 30, and to FIG. 5, a part of which shows the units decade 30 in schematic form. As may be seen in FIG. 2, the twenty switches 33 disposed in cylindrical fashion about the central shaft 31 actually define two series of ten units each. One of these units series is numbered successively from 0 to 9, the other being numbered from 0' to 9'. It may be seen that like digits of each of the series are diametrically opposed, and that the group of switches 33 which define the units decade 30 are thus arranged in what may be called two individual sets. The same arrangement is also depicted in the units decade 30 of FIG. 5, wherein each of the magnetic switches 33 has a designated decimal place from 0 to 9 or from 0' to 9'.

In FIG. 5 there is also shown the manner in which circuit connections are made between the D.C. current source 14, the biasing coils 39 and the magnetic switches 33 in the units decade 39. The input terminals 35 of the magnetic switches 33 are coupled to the D.C. source 14 through a series connection with the biasing coils 39, but in an alternating arrangement. The biasing coils 39 are arranged in two parallel groups, with each coil which is in series with the even numbered switches 33 being wound about an odd numbered switch. Similarly, a coil 39 in series with the odd numbered switches 33 is wound about an even numbered switch. Consequently, when any one switch 33 is closed in the units decade 30, the series circuit with the associated odd or even group of coils 39 is energized, and current flows through the coils 39 surrounding the adjacent open switches, whether odd or even, to establish a magnetic field which opposes closure of the adjacent odd or even switches 33 in the manner above described. This is in effect a magnetic biasing of the switches to insure non-ambiguity in the lowest order stage. Such biasing, therefore, materially increases the accuracy of the system by preventing dual indications in the lowest order of values provided as output.

These circuits include other features, however, which provide even greater reliability and accuracy. The two sets of switches 0 to 9 or 0' to 9' in the units decade 30 are utilized to control the choice of odd or even switches which may be energized in the tens decade 40. This control is exercised by selective coupling of the switches in the tens decade 40 to the D.C. source 14. The manner in which this is accomplished is set forth below. A first set of switches 0 to 9 in the units decade 30 is coupled directly and only to the outputs of the units decade 30. Therefore, when one of the first set of switches 0 to 9 is energized by closure, current flows through the closed switch only to the corresponding output terminal. When one of the switches in the opposing set 0' to 9' is actuated, however, the current flow is additionally directed through the coil 60 of a first relay which controls odd-even selection in the tens decade 40. Specifically, closure of any of the switches 0' to 9' in the units decade 30 causes current to flow to the output terminal which corresponds thereto, but also through the coil 60 of the first relay to ground.

The armature 61 of the first relay is normally biased to a first contact 62, but in response to the energization of the coil 60 is moved to a second contact 63 of the tens decade 40. The first contact 62 is coupled in parallel to all the even switches of the tens decade 40, while the second contact 63 is coupled in parallel to all the odd switches of the tens decade 40. The armature 61 is coupled to the D.C. source 14 and supplies current to the selected odd or even group of switches in the tens decade 40, so that in response to energization or non-energization of the coil 60 only an odd or even switch in the tens decade 40 can be energized. Viewed in another way, when the count has reached ten in the units decade 30, only odd numbered switches in the tens decade 40 can be energized until a count of twenty is reached.

The magnetic switches 33 of the tens decade 40 are arranged as are the corresponding switches in the units decade 30. This is, a first set 00 to 90 is diametrally opposed to a second set 00' to 90'. All even numbered switches, e.g. 00, 20, 40, etc. are coupled together, in the even grouping, while the odd numbered switches, e.g. 10, 30, 50, etc. are coupled together in the odd numbered grouping. Dependent upon the position of the armature 61 of the first relay, therefore, only one of each two adjacent switches between which the actuating magnet may lie can be energized. Consequently, the accuracy of the tens decade 40 is materially increased because of the absence of any tendency toward ambiguity.

In the units decade 30, switches in each like decimal position in the two sets of switches 0 to 9 and 0' to 9' are coupled together to a common decimal digit output. To avoid reverse current flow, the second set of switches 0' to 9' is coupled to the output through a pair of diodes 70 for each decimal position. In like fashion, within the tens decade 40, switches at the like digital positions of each set from 00 to 90 and from 00' to 90' are coupled together at a decimal digit output. Again, diode elements 72 are utilized to prevent reverse current flow between the separate sets of switches.

The odd-even choice in the hundreds decade 50 is controlled by the set of switches 00 to 90 or 00' to 90' which is energized in the tens decade 40. The grounded coil 65 of a second relay is coupled in series with each of the second set of switches 00' to 90'. The armature 66 of the second relay is normally biased to a first contact 67 which is coupled in series to each of the even numbered switches 000, 200, etc. of the hundreds decade 50. When one of the switches in the first set of switches 00 to 90 in the tens decade 40 is closed, therefore, only the even switches in the hundreds decade 50 are coupled to the D.C. source 14 through the armature 66 so as to be energizable. When the energized switch in the tens decade 40 is in the second set 00' to 90', however, the coil 65 draws the armature 66 to the second contact 68, which places the odd numbered switches in the hundreds decade 50 in series with the D.C. source 14, thus rendering them energizable. Again, only one of two adjacent switches can be energized, so that possible ambiguities in output indication are largely eliminated through this arrangement.

A brief summary of this arrangement may be provided by describing the circuit connections when the rotational position of the input shaft is such as to provide a given three digit decimal output, say "540." An even numbered decade digit in the units order of magnitude, specifically switch 0 in the first set of the units decade 30, causes only the even switches 00, 20, etc. in the tens decade 40 to be coupled to the D.C. source 14 through the first contact 62 of the first relay. For the decimal value 0 at the lowest order of magnitude, the 0 output is provided from the units decade 30 but the coil 60 is not energized. Thus, the circuit is completed between the D.C. source 14, the armature 61 and the even numbered switches in the tens decade 40 through the first contact 62. Accordingly, although one of the adjacent switches may also momentarily be closed, only the 40' switch (for the specified actuator position) may be energized in the tens decade 40. The 40' switch is in series with the coil 65 of the tens decade 40, so that the armature 66 of the second relay is switched to the second contact 68, thus permitting only the odd numbered switches (100, 300, etc.) in the hundreds decade 50 to be energized. Consequently, current flows through the armature 66 and the second contact 68 through the 500 switch to the output from the D.C. source 14 to provide the highest order of magnitude value from the system and to complete the desired "540" indication.

Figure 6:
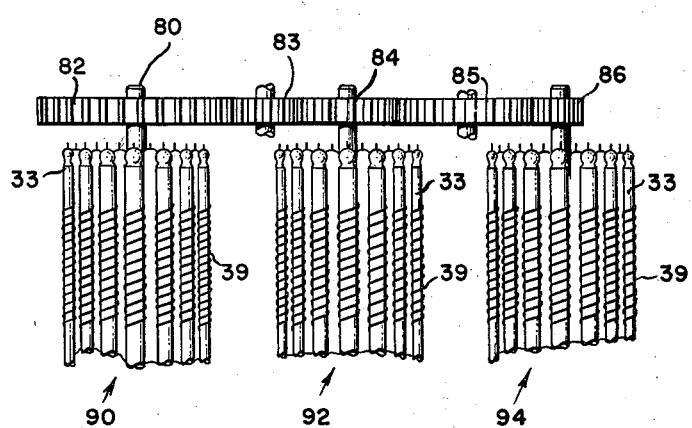
FIG. 6 is a diagrammatic plan view of another arrangement which may be employed in accordance with the invention.

High accuracy with high speed may also be provided by the arrangement of FIG. 6, which may be desirable for particular applications. In FIG. 6 are shown three groups 90, 92, 94 of switches 33, each representing a different decade stage. (It will be understood, however, that decimal relationships need not be employed, and that the stages could have any number base, including binary values.) The actuating elements are rotated within the stages from an input shaft 80 driving a gear train 82—86 having a decade step-down ratio. Ten switches 33 are provided, for simplicity, at each stage, but each of the switches 33 includes a biasing coil 39.

The biasing coils 39 are arranged in the same manner as described for the arrangement of FIGS. 1 and 5— closure of any switch 33 applies a field which opposes closure to the adjacent switches. Thus, there in nonambiguous readout from each stage although a minimum of switches 33 is employed.

Thus, there has been described an electrical signal generator which is particularly suited for converting indications of shaft position to a decimal output, such as a three digit decimal value. The system operates without contacting operative elements, and is substantially immune to wear. Further, negligible torque is imposed on the driving system whose rotational position is to be sensed, and the operation of the elements is not inherently subject to speed limitations. A number of features may be employed to provide exceptional reliability and freedom from ambiguity, such as a magnetic biasing arrangement in the lowest order stage, and a control of odd-even selection in the succeeding stages through the grouping of particular sets of switches in the lower order stages with odd and even switches in the next higher order stages.

What is claimed is:

1. A shaft position indicator system including the combination of a rotatable shaft whose position is to be indicated, an arm extending radially from the shaft, a magnetic field source attached to the free end of the arm, a number of magnetically actuatable switches regularly disposed about the rotatable shaft and individually actuatable by the magnetic field source, output circuits coupled to each of the switches for signalling which of the switches is actuated, a number of biasing coils, each wound about a different one of the switches, and series circuit couplings between the output circuits of each of the switches and biasing coils on the adjacent switches, such that a biasing field is provided to oppose actuation of adjacent switches when any one switch is actuated.

2. A system for indicating in digital form the position of a rotatable element and including in combination a rotatable shaft coupled to and movable with the rotatable element, a number of magnetically actuatable switches disposed concentrically and symmetrically about the rotatable shaft, a magnetic field source coupled to the rotatable shaft and moving past the switches as the shaft is rotated to actuate the switches successively, indicator circuits coupled to the switches for indicating which of the switches is energized, magnetizing coils individually associated with the switches for generating magnetic fields to oppose actuation of adjacent switches when a particular switch is actuated by the magnetic field source, and means connecting each magnetizing coil with the switch adjacent its associated switch.

3. An indicator for generating digital signals corresponding to the position of rotation of a rotatable element and including the combination of a central shaft coupled with a selected ratio of rotation to the rotatable element, a permanent magnet member disposed at a radius from the central shaft and movable therewith, a plurality of magnetically actuated switches symmetrically spaced about the central shaft and adjacent the path of the permanent magnet member, the number of switches providing two like digital sequences corresponding to like amounts of movement of the rotatable element, output circuit means coupled to diametrally opposed ones of the switches to represent like digital values, a number of magnetic biasing coils, each wound upon a different one of the switches, a source of direct current, and circuit connections coupling the switches to the source of direct current and each of the switches to the biasing coils on the adjacent switches in series relationship and in a sense to establish magnetic biasing to oppose actuation by the permanent magnet member of the associated switches.

4. A shaft position to digital decade converter comprising in combination a number of rotatable shafts, an input shaft the position of which is to be indicated, gear drive couplings rotating the rotatable shafts from the input shaft in decade relationships, a number of groups of magnetic switches, each of the groups being symmetrically disposed about a different one of the rotatable shafts, a number of magnetic actuators, each coupled to a different one of the rotatable shafts and extending into operative relation with each of the switches in the associated group of switches, indicator circuits coupled to the switches for providing outputs therefrom, and a group of magnetic circuits, each coupled to a different one of the switches in the lowest order decade and having circuit connections to the indicator circuits of the immediately adjacent switches in a polarity such that a biasing magnetic field is established on the switches adjacent an actuated switch to oppose actuation of the adjacent switches.

5. A system for converting the position of an element to a digital form and including the combination of a group of magnetic switches having input and output terminals, a source of power coupled to the input terminals of each of the magnetic switches, the magnetic switches being disposed in succession along a traverse path, a group of magnetic biasing coils, each wound upon a different one of the switches, circuit connections coupling alternate ones of the biasing coils together and in series relationships with the input and output circuits of the alternate magnetic switches, and a magnetic actuating source mechanically coupled to the element whose position is to be indicated and movable in the traverse path adjacent the magnetic switches so as to actuate individual switches when closest thereto, the energized magnetic biasing coils establishing magnetic fields at the switches upon which they are wound which tend to oppose actuation of the switches by the actuating source.

6. A system for converting the position of an element to a digital form and including the combination of a number of magnetic switches having elongated non-magnetic bodies and disposed in cylindrical fashion parallel to and concentric with a central axis, a rotatable shaft mounted along the central axis and mechanically coupled to the element whose position is to be indicated, a source of direct current coupled to the magnetic switches, a number of magnetic biasing coils, each one wound upon a different one of the magnetic switches for establishing a magnetic field therein when energized, circuit connections between alternate ones of the switches and the magnetic biasing coils of the remaining alternate ones of the switches, and coupled to the coils in a sense to establish magnetic fields in the switches which oppose actuation of the switches by an external means, and a magnetic actuating element coupled to the rotatable shaft at a fixed radial distance therefrom and movable adjacent the switches to actuate individual ones of said switches in dependence upon the position of the rotatable shaft.

7. An electrical signal generator for generating decimal signals in response to the rotational position of an input shaft and comprising in combination a number of groups of magnetic switches, each of the magnetic switches in a group being arranged concentrically about a different central axis, a different rotatable shaft for each of the groups, direct mechanical couplings connecting together the rotatable shafts of each of the groups and providing successive decade relationships between the successive groups, the lowest order decade group of switches including twenty switches arranged in two diametrally opposed sets, selectively energizable magnetic biasing means individually associated with each of said twenty switches for precluding the actuation of more than one of said switches at a time, a source of current coupled to an input terminal of each of the switches in the first group, and circuit switching connections coupled to the output terminals of the two sets of switches in the first group and coupling the source of current in a selected fashion to the next succeeding group of switches to provide for energization of only selected ones of the succeeding group of switches for each actuated one of the switches in the first group.

8. An electrical signal generator for generating decimal signals in response to the rotational position of an input shaft and comprising in combination three groups of magnetic switches, each of the magnetic switches in a group being arranged concentrically about a different central axis and having input and output terminals, a different rotatable shaft for each of the groups, direct mechanical couplings connecting together the rotatable shafts of each of the groups and providing successive decade relationships between the successive groups, the two lowest order decade group of switches each including twenty switches arranged in two diametrally opposed sets and the highest order decade group having ten switches, means associated with at least one of said decade groups for preventing the actuation of selected switches therein comprising magnetic biasing coils individually associated with each switch, each coil being connected to respond to the closure of an adjacent switch, a source of current coupled to an input terminal of each of the switches in the first group, first and second switches, each actuated in response to output signals of a given set of switches in the first and second groups, respectively, and circuit connections coupling odd and even switches of the second and third order decade groups to the source of current through the first and second switches, respectively, to provide that only odd or even switches of a succeeding decade group can provide an output for each actuated one of the switches in the next preceding group.

9. A system for converting the rotational position of an input element to decimal signal form and including the combination of at least three groups of magnetic switches, each of the groups being disposed concentrically about a different central axis, a different rotatable shaft positioned along the central axis of each different one of the groups, mechanical coupling means responsive to the position of the input element and coupled to the successive ones of the rotatable shafts in a decade fashion, a different magnetic actuator coupled at a fixed radial distance to each of the rotatable shafts within each group and operatively associated with the individual switches of the group as the rotatable shafts are shifted in position, a first of the groups of switches consisting of twenty switches arranged in two diametrally opposed sets to represent the decimal positions therein, magnetic biasing means individually associated with each of said twenty switches and divided into two groups, each of the magnetic biasing means groups being connected to be energized by a switch associated with the magnetic biasing means in the other group, a second of the groups of switches consisting of twenty switches arranged in two diametrally opposed sets to represent the decimal positions therein, and a third of the groups of switches consisting of ten switches, a current source coupled to the first group of switches, a first two-pole switch having two terminals coupled to odd and even switches of the second group and coupled to the current source, a second two-pole switch having two terminals coupled to the odd and even switches of the third group and coupled to the current source, and circuit connections for controlling the position of the first two-pole switch with signals from the separate sets of switches in the first group and for controlling the position of the second two-pole switch with signals from the separate sets of switches in the second group.

10. A system for accurately and non-ambiguously converting an input shaft rotational position to a decimal output and including the combination of at least two groups of magnetic switches, each of the groups of magnetic switches including a number of axially parallel switch elements having non-magnetic body portions and being disposed parallel to and symmetrically about a central axis, a first of the groups including twenty switches and a second of the groups including twenty switches, a different rotatable shaft positioned along the central axis of each of the groups of switches, mechanical coupling means coupling the input shaft to each of the rotatable shafts in a decade step-down relationship, a different permanent magnet element fixedly coupled at a fixed radial spacing from the rotatable shaft within each group of switches and in operative relation to the individual switches of the group as the rotatable shaft is rotated, a source of current coupled to provide an electrical path through each of the switches in the first group when the switches are individually closed, a number of magnetic biasing coils each wound upon a different one of the non-magnetic bodies of the switches of the first group, circuit connections coupling alternate groups of the switches with the adjacent alternate biasing coils in a sense to establish magnetic fields therein which oppose actuation of the associated switches by the permanent magnet element, circuit connections coupled to half of the switches disposed in continuous sequence in the first group and selectively coupling the source of current to the odd or even switches of the second group at one time in accordance with the set in the first group in which a switch is actuated.

11. A system for converting the rotational position of an input shaft to a three digit decimal indication and including the combination of a first group of twenty magnetic reed element switches disposed symmetrically about a central axis, each of the switches having an elongated non-magnetic body substantially parallel to the central axis and an internal magnetic reed element, each of the switches also including an external helical coil wound so as to provide when energized a longitudinal magnetic field within the switch, the first group of switches also including a central rotatable shaft coupled to the input shaft, a radial arm extending from the shaft within the group of switches, and a permanent magnet affixed to the free end of the radial arm and moving adjacent the switches as the rotatable shaft is turned, a source of direct current coupled to an input terminal of each of the switches, the switches of the first group being electrically grouped together in two successive decimal sets, and the output terminal of each of the switches being coupled to the biasing coil on the alternate switches, so as to oppose actuation of the adjacent switches by the permanent magnet when any of the switches is actuated, a circuit network including a first relay switch controlled by one set of the output terminals of the switches and coupled to the source of direct current, a second group of twenty switches symmetrically disposed about a second central axis and consisting of magnetic reed element switches, a second rotatable shaft positioned within the second group of switches and movable in decade relationship with the first rotatable shaft, a radial arm coupled thereto within the group of switches and a permanent magnet affixed at the free end of the radial arm and in operative relation to the switches, the input terminals of the odd and even switches of the second group being coupled separately to the source of direct current through the contacts of the first relay switch, interconnecting circuits coupling the output terminals of the switches in the second group of switches together in two diametrally opposed decimal sets, and a third group of switches disposed symmetrically about a third central axis, the third group of switches consisting of ten magnetic reed element switches and including a third rotatable shaft movable in decade relationship with the second rotatable shaft, a fixed radial arm extending from the shaft within the group of switches and a permanent magnet affixed to the free end of the radial arm and operatively associated with the switches in the third group as the rotatable shaft is moved, a second relay switch coupled to and controlled by one set of switches in the second group and coupled to the source of direct current, the contacts of the second relay switch connecting, respectively, the odd and even switches in the third group to the source of current, and output circuits coupled to the output terminals of the switches of each of the first, second and third groups of switches for providing three digit decimal signals therefrom.

12. Apparatus for providing discrete electrical signals indicative of the position of a rotatable member comprising a central shaft coupled to said member, a radial arm mounted on said shaft, a plurality of magnetically responsive switches regularly disposed about the central shaft at a particular distance therefrom, a permanent magnet attached to the radial arm adjacent the position of the switches for selectively actuating the switches, means for preventing the improper actuation of the switches comprising a magnetic field biasing coil individually associated with each of the switches, means for selectively energizing the biasing coils associated with adjacent switches when a particular switch is actuated by the permanent magnet so as to establish magnetic fields at said adjacent switches in opposition to the field from the permanent magnet comprising common electrical connections between alternate switches and the biasing coils of the remaining switches, a potential source connected to the biasing coils, and output terminals individually associated with particular ones of the switches for indicating which switch is actuated.

13. Apparatus for providing discrete electrical signals indicative of the position of a rotatable member comprising a central shaft coupled to said member, a radial arm mounted on said shaft, a plurality of magnetically responsive switches regularly disposed about the central shaft at a particular distance therefrom and divided into two diametrically opposed groups, a permanent magnet attached to the radial arm adjacent the position of the switches for selectively actuating the switches, means for preventing the improper actuation of the switches comprising a magnetic field biasing coil individually associated with each of the switches, means for selectively energizing the biasing coils associated with adjacent switches when a particular switch is actuated by the permanent magnet so as to establish magnetic fields at said adjacent switches in opposition to the field from the permanent magnet comprising common electrical connections between alternate switches and the biasing coils of the remaining switches, a potential source connected to the biasing coils, a plurality of output terminals each being connected to a pair of switches one from each of said groups, and means associated with the switches of one of said groups for indicating which switch of a pair is actuated when an output signal is present at a particular output terminal.

14. Apparatus in accordance with claim 13 wherein said last mentioned means comprises a two-pole relay having its energizing coil connected in series with the switches of one of said groups.

References Cited in the file of this patent

UNITED STATES PATENTS

| | | |
|---|---|---|
| 2,706,270 | Steele | Apr. 12, 1955 |
| 2,730,698 | Daniels | Jan. 10, 1956 |
| 2,850,240 | Dickinson | Sept. 2, 1958 |
| 2,922,994 | Kennedy | Jan. 26, 1960 |